United States Patent [19]

Arata

[11] Patent Number: 4,949,324

[45] Date of Patent: Aug. 14, 1990

[54] DISC-TYPE RECORDING MEDIUM TRANSFER MECHANISM

[75] Inventor: Tadao Arata, Inagi, Japan

[73] Assignee: Tanashin Denki Co., Ltd., Tokyo, Japan

[21] Appl. No.: 437,262

[22] Filed: Nov. 16, 1989

[30] Foreign Application Priority Data

Apr. 4, 1989 [JP] Japan .............................. 1-39896[U]

[51] Int. Cl.$^5$ ........................ G11B 17/26; G11B 17/22
[52] U.S. Cl. ......................................... 369/36; 369/30; 369/38
[58] Field of Search ...................... 369/36, 38, 37, 35, 369/34, 75.2; 360/98.06, 98.05, 98.04

[56] References Cited

U.S. PATENT DOCUMENTS

| | | | |
|---|---|---|---|
| 2,161,483 | 6/1939 | Mueller | 369/38 |
| 3,246,899 | 4/1966 | Bodenroder | 369/39 |
| 3,503,615 | 3/1970 | Matsuda | 369/41 |
| 4,792,865 | 12/1988 | Baumeister | 369/38 |
| 4,815,056 | 3/1989 | Toi et al. | 369/36 |

Primary Examiner—Steven L. Stephan
Assistant Examiner—Kenneth B. Wells
Attorney, Agent, or Firm—Wegner & Bretschneider

[57] ABSTRACT

A disc-type recording medium transfer mechanism includes a tray transfer device movable in a first direction parallel to the direction of stacking of a plurality of trays, and also movable in a second direction perpendicular to the first direction to transfer a selected one of the trays between its storage position within a magazine and a playback standby position outside the magazine. A tray storage position memory member is movable in the first direction and releasably engageable with the tray transfer device for movement in the second direction together with the tray transfer device only when the tray transfer device is disposed in a tray insertion/withdrawal position. Upon departure of the tray transfer device from the tray insertion/withdrawal position, the memory member is detached from the tray transfer device and left over in a position previously assigned when it is engaged with the tray transfer device before the tray transfer device departs from the tray insertion/withdrawal portion. The movement of the tray transfer device is controlled by a drive device and a contact-type switch is associated with the memory member for controlling the operation of a drive device depending on the arrested position of the memory member in the first direction.

12 Claims, 5 Drawing Sheets

DISC-TYPE RECORDING MEDIUM TRANSFER MECHANISM

BACKGROUND OF THE INVENTION

1. Field of the Invention

The present invention relates generally to a disc-type recording medium player, and more particularly to a disc-type recording medium transfer mechanism incorporated in such player and capable of storing or retaining the storage position of selected one of a plurality of stacked disc trays when the selected disc tray is pulled out from a magazine for the reproduction or playback of a disc-type recording medium carried on the selected disc tray.

2. Description of the Prior Art

Various disc-type recording medium transfer mechanisms are known in which when the play button of the player is actuated, selected one of a plurality of stacked disc trays is pulled out or drawn from a magazine. In this instance, a storage position of the selected disc tray within the magazine is stored by a memory means. The selected disc tray is transferred by a tray transfer device from the storage position to a playback standby position determined with respect to a playback mechanism for the reproduction or playback of a disc-type recording medium carried on the selected disc tray. When the stop button is actuated to terminate the playback operation, the selected disc tray is returned from the reproduction standby position to the storage position which is previously stored in the memory means.

Some of the known disc-type recording medium transfer mechanisms include a memory circuit and a backup power supply connected thereto for retaining electrically stored information in the memory circuit when the power is inadvertently cut off while the player is operating in the playback mode. When the power line is recovered, a stop operation is achieved automatically depending on the information stored in the memory circuit so that the selected disc tray is temporarily returned to its storage position within the magazine, in preparation for the next step of operation. (If the memory circuit were not provided, the disc tray drawn from the magazine would not be returned to its storage position within the magazine, thus causing an operation failure.)

With the electric memory circuit and the backup power supply thus provided, the known transfer mechanisms are however complicated in circuit construction and costly to manufacture.

Another type of disc-type recording medium transfer mechanisms is known in which a mechanical memory device is incorporated to store or retain the storage position of each disc trays. The mechanical memory device comprises a plurality of switches corresponding in number and position to the number and position of the stacked disc trays. Each of the switches is activated when a corresponding one of the stacked disc trays is drawn from the magazine, thereby storing the storage position of the thus-drawn disc tray. An alternative form of the mechanical memory device includes a plurality of guide grooves extending in alignment with corresponding ones of the stacked disc trays and engageable with a tray transfer device for guiding the letter when the respective disc trays are drawn from and thrusted into their storage positions within the magazine. In response to the stop operation, the disc tray is returned to its storage position through engagement between one of the guide groove and the tray transfer device.

The first-mentioned mechanical memory device requires a plurality of switches corresponding in number to the number of the disc trays and hence is complicated in construction and costly to manufacture. In the last-mentioned mechanical memory device, the guide grooves for guiding the tray transfer device must coextend with the entire length of movement of the tray transfer mechanism. With this long guide groove, the mechanical memory device enlarges the overall size of the disc-type recording medium transfer mechanism. Further, the transfer mechanism is per se complicated in construction and costly to manufacture.

SUMMARY OF THE INVENTION

With the foregoing difficulties in view, it is an object of the present invention to provide a disc-type recording medium transfer mechanism which is simple in construction and can be manufactured at a low cost, and is capable of reliably storing or retaining the storage position of each disc tray within a magazine.

According to the present invention, a disc-type recording medium transfer mechanism includes a magazine storage for releasably holding therein a magazine in which a plurality of disc trays are stacked one above another in a first direction for supporting thereon disc-type recording mediums, respectively. A tray transfer means is movable in the first direction and also movable in a second direction perpendicular to the first direction to reciprocate between a tray insertion/withdrawal position close to the magazine storage and a playback standby position remote from the magazine storage for transferring a selected one of the trays between a storage position within the magazine and the playback standby position. A tray storage position memory member is movable in the first direction and is releasably engageable with the tray transfer means to move in the second direction together with the tray transfer means only when the tray transfer means is disposed in the tray insertion/withdrawal position. Upon departure of the tray transfer means from the tray insertion/withdrawal position, the memory member is released from the tray transfer means and is left over in a position of its previous engagement with the tray transfer means assigned before the tray transfer means departs from the tray insertion/withdrawal position. A drive means is provided for moving the tray transfer device selectively in the first and second directions. A contact-type switch is operative to control activation and de-activation of the drive means depending on the position of the memory member in the first direction.

With this construction, the tray storage position memory member moves together with the tray transfer means as the latter is driven to move in the first direction to select a desired one of the stacked disc trays in the magazine. The tray transfer means moves in a direction away from the magazine to pull out or withdraw the selected tray from the magazine whereupon interlocking engagement between the tray transfer means and the memory member is released. The memory member is hence left over in the position of withdrawal of the selected tray with the result that the storage position of the selected tray within the magazine is stored or retained by the memory member. Thereafter, the tray transfer means is moved in the first direction from the playback standby position to a position corresponding to the left-over position of the memory member whereupon the contact-type switch is activated to issue a control signal to the drive means which in turn stops movement of the tray transfer means in the first direction and also moves the tray transfer means in the second direction toward the magazine. Consequently, the selected tray is returned to its storage position within the magazine which is equivalent to the left-over position of the memory member.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

The present invention will be described hereinbelow in greater detail with reference to a preferred embodiment shown in the accompanying drawings.

Figure 1:
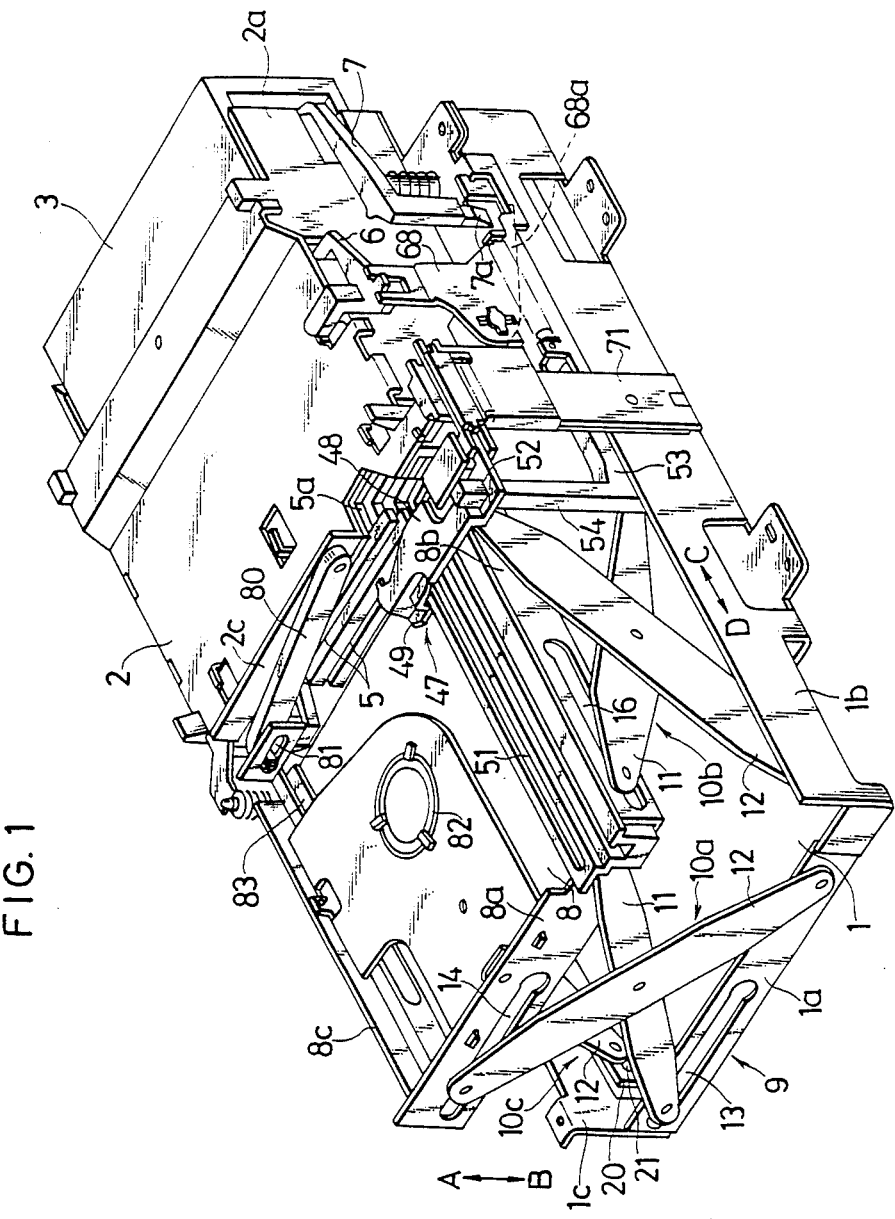
FIG. 1 is a perspective view of a disc-type recording medium player incorporating a disc-type recording medium transfer mechanism according to the present invention.
Figure 2:
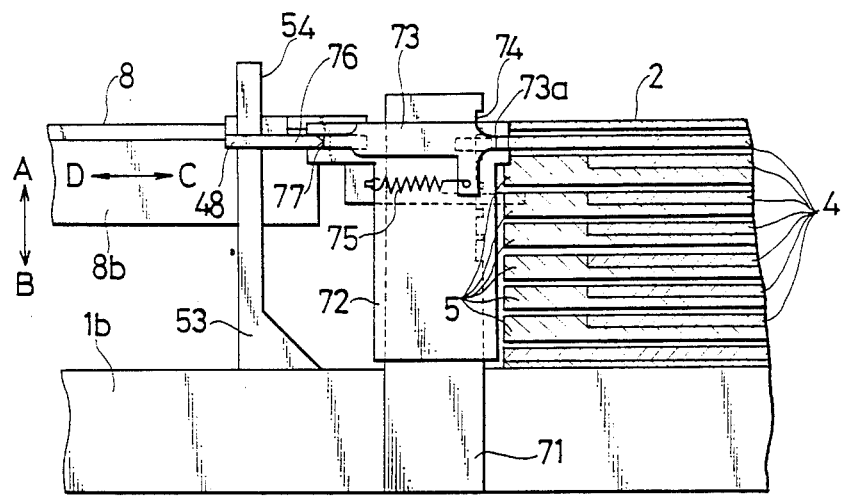
FIG. 2 is a side view of a portion of the disc-type recording medium transfer mechanism of FIG. 1, with parts broken away for clarity, illustrative of a disc tray just prior to being drawn from the storage position in a magazine.
Figure 3:
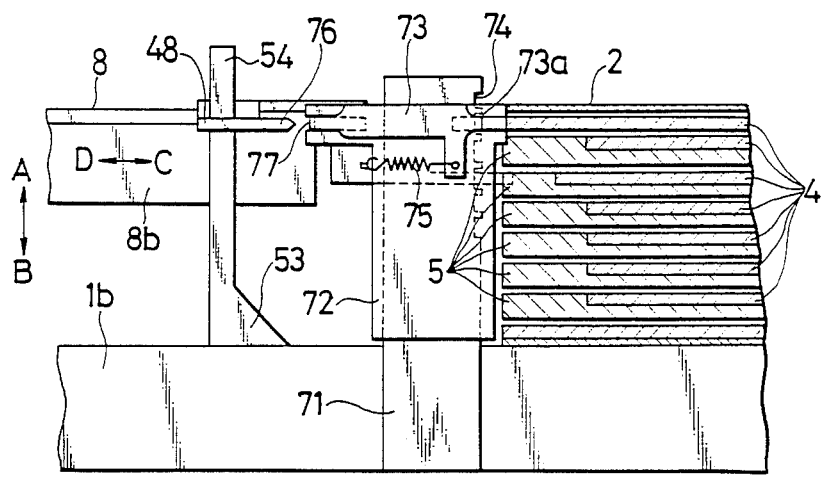
FIG. 3 is a view similar to FIG. 2, but showing the disc tray as it is pulled out from the storage position.

FIG. 1 is a perspective illustration of a disc-type recording medium player incorporating a disc-type recording medium transfer mechanism according to the present invention shown with parts in the inoperative condition. The transfer mechanism includes a rectangular main base plate 1 and a magazine storage 2 mounted on an upper surface of the main base plate 1 along a longitudinal portion extending between a substantially central portion and one end (rear end in the same figure) of the main base plate 1. The magazine storage 2 comprises a generally rectangular box with opposite ends (front and rear ends in FIG. 1) open and releasably retains or houses therein a magazine 3 in which a plurality of disc-type recording medium trays (hereinafter referred to as "trays") 5 are stacked or superposed one above another in a direction (vertical direction in FIG. 1) perpendicular to a central axis extending across the centers of the respective open ends of the magazine storage portion 2. Each of the trays 5 carries one disc-type recording medium (compact disc, for example) 4, as shown in FIGS. 2 and 3. The magazine 3 as it is stored in the magazine storage 2 is locked in a predetermined loading position by a lock arm 6 disposed on the outside surface of one sidewall (on the right side in FIG. 1) 2a of the magazine storage 2. When the magazine 2 is stored in the magazine storage 2, the respective trays 5 are released from locking engagement with the magazine 3 by means of an L-shaped release arm 7 disposed on the outside surface of the right sidewall 2a of the magazine storage 2.

Figure 4:
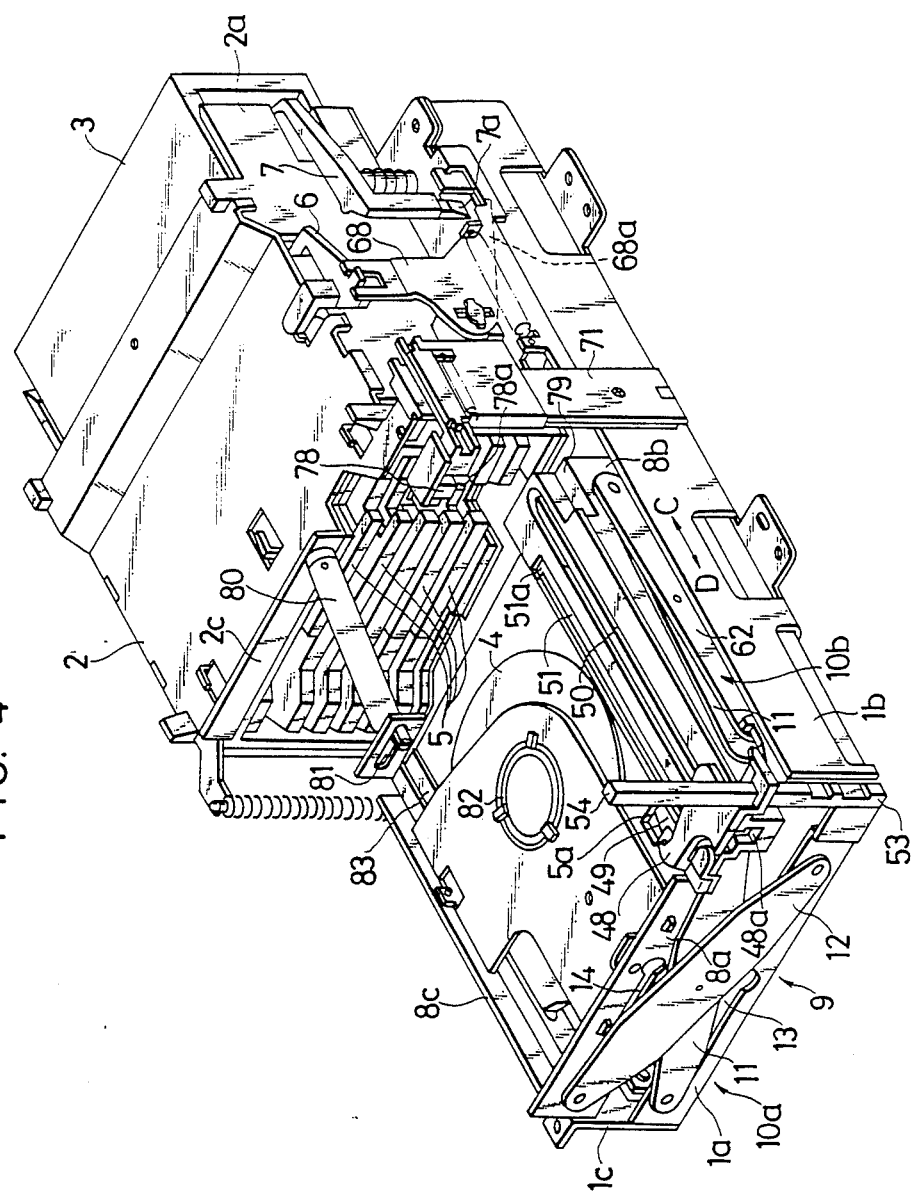
FIG. 4 is a perspective view of the disc-type recording medium transfer mechanism of FIG. 1 shown with parts in the playback operation mode.
Figure 5:
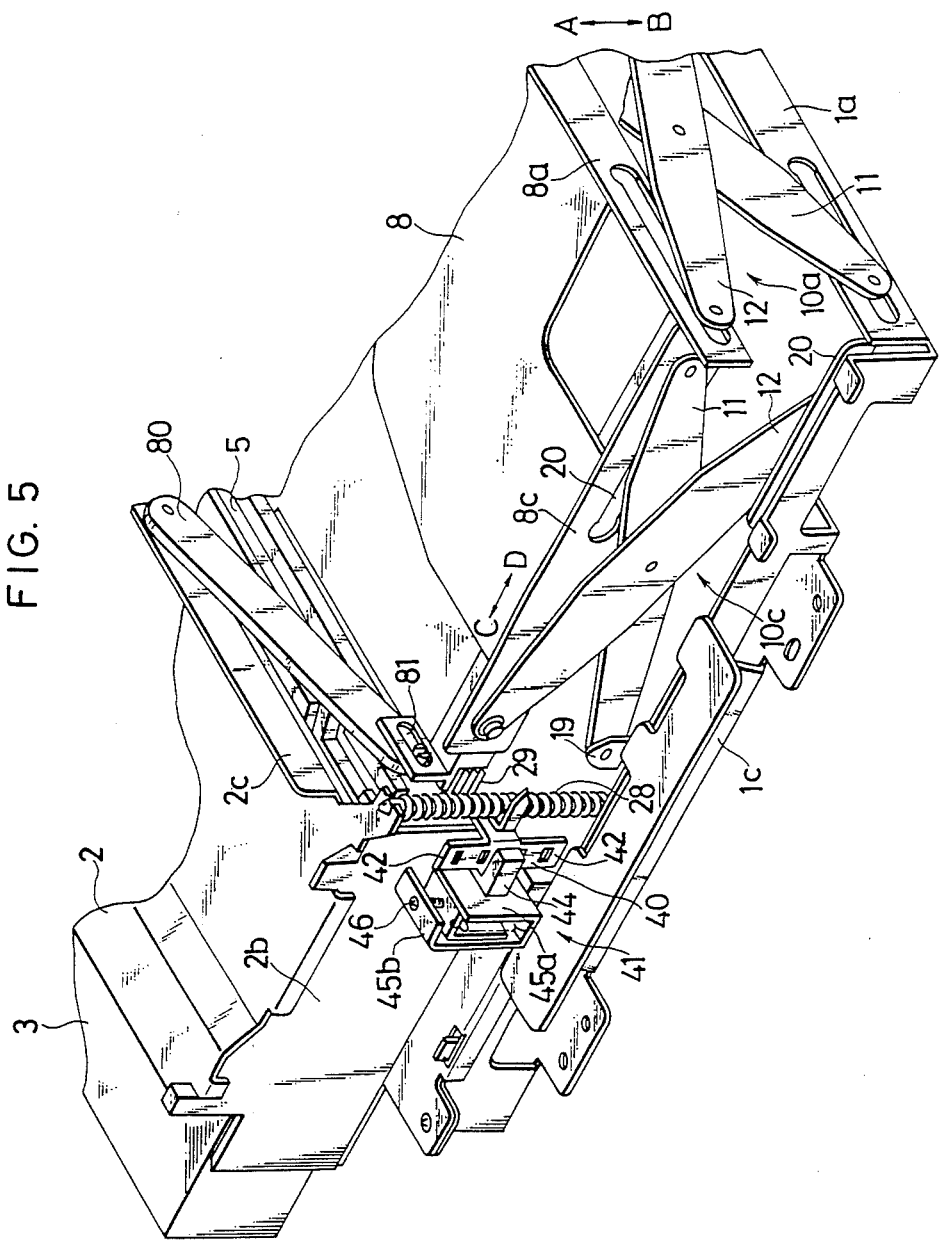
FIG. 5 is a fragmentary perspective view of the disc-type recording medium transfer mechanism in the direction opposite to the direction of FIG. 1.

An auxiliary base plate 8 is disposed above a longitudinal portion of the main base plate 1 extending between the substantially central portion and the opposite end (front end in FIG. 1) of the main base plate 1 and is connected to the main base plate 1 via a link mechanism 9 such that the auxiliary base plate 8 is movable in a direction parallel to the direction of stacking of the trays 5 as indicated by the arrowheads A and B in FIG. 1. The link mechanism 9, as shown in FIGS. 1, 4 and 5, is composed of three identical linkages 10a, 10b and 10c disposed on the front ends and the opposite sides of the main and auxiliary base plates 1, 8. Each of the linkages 10a, 10b, 10c includes a pair of elongate link plates 11, 12 pivotally connected together at their central portions.

In the linkage 10a disposed on the front end, the inner link plate 11 has one end (lower end in FIGS. 1, 4 and 5) pivotably and slidably connected with an oblong hole 13 formed longitudinally in the front end wall 1a of the main base plate 1, the opposite end (upper end in the same figures) of the same link plate 11 being pivotably connected to the front end wall 8a of the auxiliary base plate 8. The inner link plate 12 has one end (lower end in the same figures) pivotably connected to the front end wall 1a of the main base plate 1, the other end (upper end in the same figures) of the same link plate 12 being pivotably and slidably connected with an oblong hole 14 formed longitudinally in the front end wall 8a of the auxiliary base plate 8.

Likewise, in the linkage 10b which is disposed on one or the right side of the illustrated player, the inner link plate 11 has a lower end pivotably connected to an upstanding lug 15 (FIG. 6) disposed on the upper surface of the main base plate 1 at a position inside a right sidewall 1b of the main base plate 1. The upper end of this link plate 11 is pivotably and slidably connected with an oblong hole 16 formed longitudinally in a right sidewall 8b of the auxiliary base plate 8. The outer link plate 12 has a lower end pivotably and slidably connected with an oblong hole 18 formed longitudinally in an elongate mounting wall 17 (FIG. 6) which is disposed on the upper surface of the main base plate 1 and extends parallel to the right sidewall 1b on the inside of the same. The upper end of the same link plate 12 is pivotably connected to the right sidewall 8b of the auxiliary base plate 8.

Further, the inner link plate 11 of the linkage 10c disposed on the left side of the illustrated player has a lower end pivotably connected to an upstanding support lug 19 (FIG. 5) disposed on the main base plate 1 at position inside a left sidewall 1c of the main base plate 1. The other end of this link plate 11 is pivotably and slidably connected with an oblong hole 20 formed longitudinally in a left sidewall 8c of the auxiliary base plate 8. Likewise, one end of the outer link plate 12 has a lower end pivotably and slidably connected with an oblong hole 22 formed longitudinally in the left sidewall 1c of the main base plate 1, the upper end of the same link plate 12 being pivotably connected to the left sidewall 8c of the auxiliary base plate 8.

Figure 6:
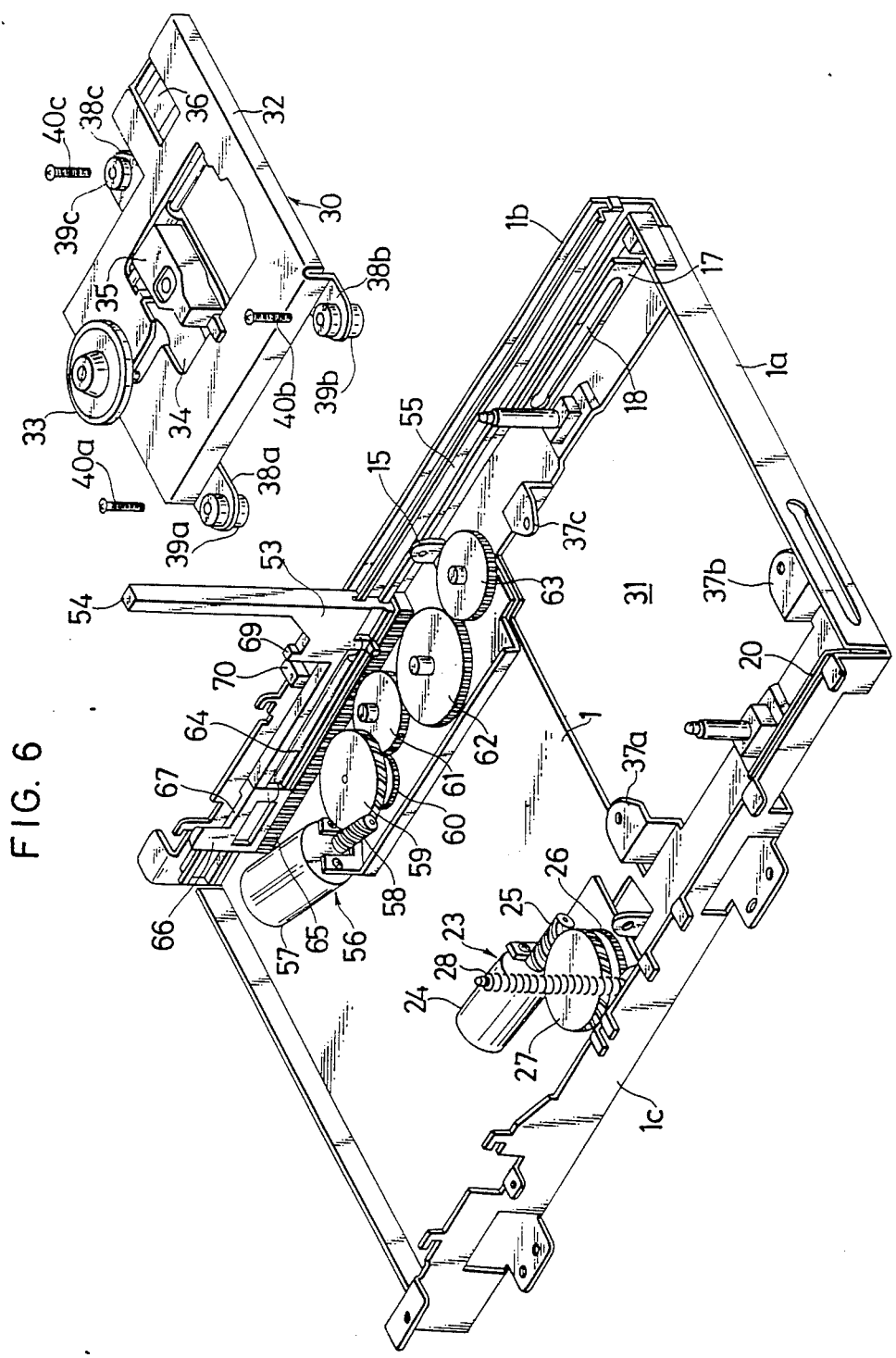
FIG. 6 is an exploded perspective view of first and second transfer devices of the transfer mechanism and a playback unit of the disc-type recording medium player shown in FIG. 1.

The auxiliary base plate 8 is moved in the direction of stacking of the trays 5 by means of a first transfer means or device 23 which is disposed on the upper surface of the main base plate 1 adjacent to the left sidewall 1c. As shown in FIGS. 5 and 6. The first transfer device 23 includes a motor 24 mounted on the upper surface of the main base plate 1, a first worm gear 25 fixed to a drive shaft of the motor 24, a first worm wheel 26 rotatably mounted on the upper surface of the main base plate 1 and held in mesh with the worm gear 25, a second worm wheel 27 disposed above and connected to the first worm wheel 26 for co-rotation therewith, a second worm gear 28 rotatably mounted on and extending vertically upwardly from the upper surface of the main base plate 1, the second worm gear 28 being held in mesh with the second worm wheel 27, and a rack 29 (FIG. 5) held in mesh with the second worm gear 28 and disposed on the outside surface of the lift sidewall 1c of the auxiliary base plate 8 at the rear end of the left sidewall 1c. With the first transfer device 23 thus constructed, when the motor 24 is rotated reciprocally or in the forward and reverse directions, a rotary motion of the drive shaft of this motor 24 is translated through the first worm gear 25, the first and second worm wheels 26, 27, the second worm gear 28 and the rack 29 into a vertical linear reciprocating motion of the auxiliary base plate 8.

The main base plate 1 supports thereon a playback unit 30 disposed below the auxiliary base plate 8. As shown in FIG. 6, the playback unit 30 includes a support plate 32 extending over a generally rectangular opening 31 formed in the front half of the main base plate 1, a turntable 33 rotatably mounted on the support plate 32, a drive motor 34 mounted on the under side of the support plate 32 for driving the turntable 33, a pickup 35 mounted on the support plate 32 and a pickup drive motor 36 mounted on the support plate 32 for driving the pickup 34. The main base plate 1 has three inverted L-shaped support brackets 37a, 37b, 37c disposed at the peripheral edge of the opening 31 in circumferentially spaced relation. The support plate 32 has three apertured mounting legs 38a, 38b, 38c projecting laterally outwardly from the peripheral wall of the support plate 32 at positions corresponding respectively to the positions of the support brackets 37a, 37b, 37c. Each of the apertured mounting legs 38a, 38b, 38c has a tubular rubber cushion 39a, 39b, 39c fitted in the aperture in the mounting leg 38a, 38b, 38c. Three screws 40a, 40b, 40c extend through the tubular rubber cushions 39a, 39b, 39c and are threaded into corresponding threaded holes, not designated, in the respective support brackets 37a, 37b, 37c, thereby fastening the support plate 32 to the main base plate 1.

As shown in FIG. 5, a position detecting means or device 41 is disposed on the outside of the left sidewall 8c of the auxiliary base plate 8 adjacent to the rear end thereof for detecting the position of the auxiliary plate 8. The position detecting device 41 includes an elongate vertical plate member 43 disposed outside the left sidewall 8c of the auxiliary base plate 8 and movable together with the auxiliary base plate 8 in a direction parallel to the direction of stacking of the trays 5, and a photoelectric switch 44 disposed on the outside surface of a left sidewall 2b of the magazine storage 2, the plate member 43 having a plurality of rectangular apertures 42 corresponding in number to the number of trays 5 and spaced at predetermined intervals in the direction of stacking of the trays 5. The photoelectric switch 44 is mounted on the outside surface of the left sidewall 2b of the magazine storage 2 via a pair of brackets 45a, 45b. The photoelectric switch 44 is adjustable in position in the direction of stacking of the trays 5 by turning a fine adjustment screw 46 in either direction. The photoelectric switch 44 is disposed in confrontation with the plate member 43. Thus, the position of the auxiliary base plate 8 in the direction of stacking of the trays 5 can be electrically detected by determining which aperture 42 is disposed in confrontation to the photoelectric switch 44.

As shown in FIG. 1, a tray transfer means or device 47 is mounted on an upper surface of the auxiliary base plate 8 and movable in a direction perpendicular to the direction of stacking of the trays 5, as indicated by the arrowheads C and D. The tray transfer device 47 is so constructed as to transfer the trays 5 between a storage position located within the magazine 3 and a playback standby position confronting the turntable 33 of the playback unit 30. The tray transfer device 47 includes an elongate transfer member 48, and a hook member 49 pivotably connected to one end of the transfer member 48 and pivotally movable in a plane extending perpendicular to the direction of stacking of the trays 5. The transfer member 48 has on its under surface a guide projection 48a (FIG. 4) slidably received in a guide groove 50 extending longitudinally in the upper surface of the auxiliary base plate 8 along the right sidewall 8b thereof. The hook member 49 is releasably engageable with a cutout locking recess 5a in each tray 5 and is normally urged by a spring, not shown, to turn counterclockwise in FIGS. 1 and 4, i.e. in a direction to hook the cutout locking recess 5a of the tray 5. The hook member 49 has an engagement portion, not shown, slidably received in an actuation groove 51 extending in the upper surface of the auxiliary base plate 1 in parallel spaced relation to the guide groove 50. The non-illustrated engagement portion thus received in the actuation groove 51 prevents the hook member 49 from turning in the counterclockwise direction under the force of the spring. When the engagement portion arrives at a lateral recess 51a formed at the rear end of the actuation groove 51, the engagement between this engagement portion and the actuation groove 51 is released whereupon the hook member 49 is turned in the counterclockwise direction by the force of the spring. The transfer member 48 has at its other end a rectangular hole 52 slidably fitted over a vertical guide column 54 of a slide member 53 which is disposed inside the right sidewall 1b of the main base plate 1 and reciprocally movable along the right sidewall 1b. The transfer member 48 is movable along the guide column 54 in the same direction as the direction of stacking of the trays 5. As shown in FIG. 6, the slide member 53 is generally L-shaped and slidably mounted on a guide rail 55 extending along the right sidewall 1b of the main base plate 1 on the inside of the right sidewall 1b. The slide member 53 is moved by a second transfer means or device 56 disposed adjacent to the right sidewall 1 of the main base plate 1. The second transfer device 56 and the first transfer device 23 described above jointly constitute a drive means for the tray transfer device 47.

The second transfer device 56 includes, as shown in FIG. 6, a motor 57 mounted on the upper surface of the main base plate 1 adjacent to the right sidewall 1b thereof, a worm gear 58 fixed to a drive shaft of the motor 57, a worm wheel 59 held in mesh with the worm gear 58, a first spur gear 60 mounted coaxially with the worm wheel 59 and rotatable simultaneously with the worm wheel 59, a second spur gear 61 held in mesh with the first spur gear 60, a third idler spur gear 62 meshing with the second spur gear 61, a fourth spur gear 63 held in mesh with the third idler spur gear 62, and a rack 65 engageable in driven mesh with the second and fourth spur gears 61, 63 and resiliently connected to the slide member 53 by means of a tension coil spring 64. The second and fourth spur gears 61, 63 are identical in structure and at least one of them is always held in meshing engagement with the rack 65. With the second transfer device 56 thus constructed, when the motor 57 is driven to rotate reciprocally in the forward and reverse directions, a rotary motion of the drive shaft of this motor 57 is translated through the worm gear 58, the worm wheel 59, the first to fourth spur gears 60–63 and the rack 65 into a horizontal linear reciprocating motion of the slide member 53. This reciprocating motion of the slide member 53 causes the transfer member 48 and the hook member 49 of the tray transfer device 47 to reciprocate back and forth as indicated by the arrowheads C and D shown in FIG. 4. The combined use of the spur gears 61, 62 and the rack 65 has the advantage that the slide member 53 can be reciprocated over a distance much longer than the length of the rack 65.

The slide member 53 has a first and second engagement portions 66, 67 (FIG. 6) disposed at its rear end remote from the vertical guide column 54 and extending contiguously at an angle of 90 degrees. When the slide member 53 is disposed in its one endmost position in the direction of the arrow C shown in FIG. 1, the engagement portions 66, 67 engage the lower end portion 7a of the L-shaped release arm 7 to cause the latter to release the trays 5 from locking engagement with the magazine 3. When the rack 65 connected to the slide member 53 is moved to its endmost position in the direction of the arrow C, the second engagement portion 67 engages the lower end portion 68a of an L-shaped pivot arm 68 to turn the same counterclockwise in FIG. 1, thereby disengaging the lock arm 6 from the magazine 3. The slide member 53 has a presser portion 69 disposed adjacent to the guide column 54. When the slide member 53 is disposed at its endmost position stated above, the presser portion 69 is brought into engagement with a tray insert-position detector switch 70 fixed to a predetermined position on the inside surface of the right sidewall 2a of the magazine storage portion 2, so that the arrival of the slide member 53 at a tray insert position is electrically detected by the detector switch 70.

A vertical support plate 71 is connected to an intermediate portion of the right sidewall 1b of the main base plate 1 and extends upwardly therefrom. As shown in FIGS. 2 and 3, a tray storage position memory member 72 is mounted on the vertical support plate 71 and movable in a direction parallel to the direction of stacking of the trays 5 for storing the storage position of a selected one of the trays 5 pulled out or drawn from the magazine 3. The memory member 72 includes an elongate horizontal locking piece 73 slidably movable in the same direction as the transfer member 48 of the tray transfer device 47. The locking piece 73 has a laterally bent rear end portion 73a releasably engageable with one of a plurality of locking recesses 74 formed in and along a rear longitudinal edge of the vertical support plate 71 at positions corresponding to the stacked positions of the respective trays 5. The locking piece 73 is urged by a tension coil spring 75 leftward in FIG. 2 to keep interlocking engagement between its rear end portion 73a and one of the locking recesses 74. With this interlocking engagement between the rear end portion 73a and the locking recess 74, the locking piece 73 is locked in position against displacement relative to the support plate 71. To unlock the locking piece 73 from the support plate 71, the locking piece 73 is urged rightward in FIG. 2 against the force of the tension coil spring 75 until the rear end portion 73a is disengaged from the locking recess 74. To this end, the memory member 72 has a horizontal retaining recess 77 opening forwardly for releasably receiving therein a locking prong 76 of the transfer member 48 when the transfer member 48 is disposed in a tray insertion/withdrawal position. The locking prong 76 is engaged in and released from the retaining recess 77 only in the directions indicated by the arrowheads C, D. Accordingly, in response to the movement of the transfer member 48 in the direction of the arrow C, the locking prong 76 is fitted in the retaining recess 77 and then urges the locking piece 73 rightward in FIG. 2 to thereby release interlocking engagement between the rear end portion 73a of the locking piece 73 and the locking recess 74 in the support plate 71 Hence, the locking piece 73 is movable in the direction of stacking of the trays 5.

The memory member 72 is associated with a contact-type switch 78 having an actuator 78a directed downwardly toward the upper surface of the auxiliary base plate 8, as shown in FIG. 4. When the auxiliary base plate 8 is moved from the replaying position upwardly away from the main base plate 1, the actuator 78a is engaged with a stepped engagement portion 79 provided at the rear end of the right sidewall 8b of the auxiliary base plate 8, whereupon the contact-type switch 78 is activated to issue a command signal to the first and second transfer mechanisms 23, 56 for stopping movement of the auxiliary base plate 8 in the direction of stacking of the trays 5 and also moving the tray transfer transfer device 47 rearwardly toward the magazine storage 2 (in the direction indicated by the arrow C in FIG. 1) along a path extending perpendicular to the direction of stacking of the trays 5 to thereby return one tray 5 into its storage position within the magazine 3 which is equivalent to a storage position for the same tray 5 stored in the memory member 72.

As shown in FIG. 1, 4 and 5, a stop lever 80 is pivotably connected at its one end to an upper flange 2c of the front open end of the tray storage 2, the other end of the stop lever 80 being pivotably and slidably connected with an oblong hole 81 extending horizontally along the rear end edge of the auxiliary base plate 8. The stop lever 80 thus connected is pivotally movable to turn about the one end in response to the vertical movement of the auxiliary base plate 8. The stop lever 80 extends diagonally across the front open end of the magazine storage 2 so as to prevent a tray 5 from plunging out from the magazine 3 to the side of the auxiliary base plate 8 which would otherwise be caused when the magazine 3 is abruptly loaded into the magazine storage 2. The auxiliary base plate 8 includes a clamper 82 (FIGS. 1 and 4) for forcing the disc-type recording medium 4 against the turntable 33. The right and left sidewalls 8b, 8c of the auxiliary base plate 8 have a pair of confronting tray guide channels 83 (only left side one being shown) for guidedly receiving opposite edges of the tray 5 as the tray 5 is moved into and out of the magazine 3.

The disc-type recording medium transfer mechanism of the foregoing construction operates as follows. In the stop mode or while the player is kept in the inoperative condition, the auxiliary base plate 8 is disposed in its lowermost position close to the main base plate 1, and the locking prong 76 of the transfer member 48 of the tray transfer mechanism 47 is held in locking engagement with the retaining recess 77 in the locking piece 73 of the memory member 72, with the rear end portion 73a of the locking piece 73 kept disengaged from the locking recesses 74 in the vertical support plate 71. Likewise the auxiliary base plate 8, the tray transfer device 47 is disposed closest to the main base plate 1. In this condition, the magazine 3 is loaded in the magazine storage 2 whereupon the thus-loaded magazine 3 is locked by the lock arm 6 in a predetermined loading position within the magazine storage 2, and the respective trays 5 are released by the release arm 7 from interlocking engagement with the magazine 3. In this instance, if the magazine 3 were abruptly pushed into the magazine storage 2, any of the trays 5 would plunge out toward the auxiliary base plate side as soon as the interlocking engagement between the respective trays 5 and the magazine 3 is released by the release arm 7. Such accidental plunging-out of the tray 5 can be prevented according to the present invention by means of the stop lever 8 which extends diagonally across the rear open end of the magazine storage 2 to block the path of movement of the trays 5.

After the magazine 3 is loaded in the magazine storage 2, a desired one of the stacked trays 5 (e.g., a second uppermost tray in the illustrated embodiment) is selected by actuating an appropriate selector actuator such as a tray select button, not shown, for playing back the disc-type recording medium 4 carried on the thus-selected tray 5. Then a play button, not shown, of the player is actuated whereupon the motor 24 of the first transfer device 23 is rotated in one direction to move the auxiliary base plate 8 upwardly away from the main base plate 1 along the direction of stacking of the trays 5. At the same time, the tray transfer device 47 and the memory member 72 are moved together with the auxiliary base plate 8. When the auxiliary base plate 8 reaches to a position corresponding to the position of the selected tray 5 stored in the magazine 3, the arrival of the auxiliary base plate 8 at this position is electrically detected by the auxiliary base-plate position-detecting means or device 41. The position-detecting device 41 thus issues an electric detection signal to terminate the supply of an electric power to the motor 23 of the first transfer device 23, so that the upward movement of the auxiliary base plate 8 is stopped and the hook member 49 of the transfer member 48 engages in the cutout locking recess 5a of the selected tray 5 from the under side of the latter. In this condition, the retaining recess 77 of the memory member 72 lockingly receives therein the locking prong 76 of the transfer member 48 as shown in FIG. 2, and the locking piece 73 is urged rightward in the same figure against the force of the tension coil spring 75 to disengage its rear end portion 73a from the locking recesses 74.

Subsequently, based on the electric detection signal stated above, the motor 57 of the second transfer device 56 is rotated in one direction to move the tray transfer device 47 in the direction indicated by the arrow D, thereby pulling out the selected tray 5 from the magazine 3. With this movement of the selected tray 5 caused by the tray transfer device 47, the locking prong 76 of the transfer member 48 is removed from the retaining recess 77 of the memory member 72 whereupon the locking piece 73 is urged leftward by the force of the tension coil spring 75 to thereby cause the rear end portion 73a to fit into a second uppermost one of the locking recesses 74, as shown in FIG. 3. Consequently, the locking piece 73 is firmly retained on the vertical support plate 71 at a position corresponding to the storage position of the selected tray 5 being pulled out from the magazine 3. The storage position of the tray 5 is thus stored or temporarily retained by the memory member 72.

Thereafter, the tray 5 drawn by the tray transfer device 47 is advanced in the direction of the arrow D while being guided by and along the guide channels 83 (FIG. 4) until it arrives at a playback standby position above the turntable 33 of the playback unit 30 (FIG. 6). The arrival of the tray 5 at this playback standby position is detected by a non-illustrated detection switch which in turn issues an electric detection signal to cut off the power to the motor 57 of the second transfer device 56, thereby stopping forward movement of the tray transfer device 47. At the same time, the electric detection signal is also supplied to the first transfer mechanism 23 to rotate the motor 24 in a reverse direction opposite to the direction stated above whereupon the auxiliary base plate 8 is lowered toward the main base plate 1 for setting the disc-type recording medium 4 on the turntable 33 of the playback unit 30. This setting of the disc-type recording medium 4 is detected by a detector switch, not shown, which in turn issues an electric detection signal to cut off the power to the motor 24 of the first transfer device 23, thereby stopping downward movement of the auxiliary base plate 8. Then the disc-type recording medium 4 is forced by the clamper 82 against the turntable 33 being rotated, and hence the disc-type recording medium 4 and the turntable 33 rotates in unison with each other. Thus the recorded information is read out from the disc-type recording medium 4 via the pickup 35 and reproduced in the form of sound, picture or the combination thereof. When the reproduction of the recorded information is completed, a stop button, not shown, of the player is actuated whereupon the selected tray 5 is returned to the second uppermost storage position within the magazine 3 in the reverse order of the removal stated above. When the tray 5 is return to its storage position within the magazine 3, the presser portion 69 of the slide member 53 activates the detector switch 70 to thereby stop movement of the tray transfer device 47 in the direction of the arrow C and also lower the auxiliary base plate 8 and the memory member 72 to their lowermost positions. Then the operation of the player is stopped with parts assuming their initial inoperative positions.

When the power is inadvertently cut off while the player is operating in the playback mode, a power switch, not shown, is actuated again to resume the power. In response to this actuation of the power switch, the motor 24 of the first transfer device 23 is rotated in said one direction to move the auxiliary base plate 8 upwardly away from the main base plate 1. Upward movement of the auxiliary base plate 8 causes the stepped engagement portion 79 to engage the actuator 78a of the contact-type switch 78 whereupon the contact-type switch 78 is activated to issue a predetermined command signal to the first and second transfer devices 23, 56. With this command signal, the supply of power to the motor 24 of the first transfer device 23 is cut off and the motor 57 of the second transfer device 56 is energized to rotate in the reverse direction. Consequently, the tray transfer device 47 is moved from its advanced position shown in FIG. 4 in the direction of the arrow C toward the magazine storage 2. With this movement of the tray transfer device 47, the tray 5 is concurrently moved in the same direction toward the magazine 3. A continuous movement of the tray transfer device 47 causes the tray 5 to be returned to the predetermined storage position within the magazine 3. Substantially at the same time, the locking prong 76 of the transfer member 48 is brought into engagement with the retaining recess 77 in the memory member 72 and then urges the locking piece 73 rightward in FIG. 2 against the force of the tension coil spring 75 to thereby disengage the rear end portion 73a from the second uppermost locking recess 74. The memory member 72 is hence vertically movable relative to the support plate 71. When the tray 5 is returned by the tray transfer device 47 to the storage position within the magazine 3, the presser portion 69 of the slide member 53 activates the detector switch 70 to thereby stop returning movement of the tray transfer device 47 and also to lower the auxiliary base plate 8 and the memory member 72 concurrently to their lowermost positions close to the main base plate 1. Thus the disc-type recording medium transfer mechanism of the player is stopped with parts retained in their initial positions.

When an eject button, not shown, of the player is actuated, the rack 65 (FIG. 6) is moved in the direction of the arrow C shown in FIG. 4 toward its endmost position to cause the pivot arm 68 to turn counterclockwise in the same figure. This angular movement of the pivot arm 68 causes the lock arm 6 to release the magazine 3 from interlocking engagement with the magazine storage 2 whereupon the magazine 3 is thrusted out from the magazine storage 2 by the force of an ejector spring (not shown) disposed in the magazine storage 2. In response to the ejection of the magazine 3, a non-illustrated stop switch disposed in the magazine storage 2 is activated to cut off the power to the respective motors of the player.

As described above, the withdrawal positions of the respective trays can be reliably stored or retained by a mere combination of a single mechanical memory member and a single contact-type switch. This combination is simpler in construction and can be manufactured less costly than conventional memory devices composed of a combination of an electric memory circuit and a backup power supply, or a plurality of switches or guide grooves corresponding in number to the number of the stacked trays.

Obviously, various modifications and variations of the present invention are possible in the light of the above teaching. It is therefore to be understood that within the scope of the appended claims the invention may be practiced.

What is claimed is:

1. A disc-type recording medium transfer mechanism comprising:
    (a) a magazine storage for releasably holding therein a magazine which has a plurality of disc trays releasably held therein and stacked one above another in a first direction for supporting thereon disc-type recording mediums, respectively;
    (b) a tray transfer means movable in said first direction and also in a second direction perpendicular to said first direction to reciprocate between a tray insertion/withdrawal position close to said magazine storage and a playback standby position remote from said tray magazine storage for transferring a selected one of the trays between a storage position within said magazine and said playback standby position;
    (c) a tray storage position memory member movable in said first direction and releasably engageable with said tray transfer means to move in said second direction together with said tray transfer means only when said tray transfer means is disposed in said tray insertion/withdrawal position, upon departure of said tray transfer means from said tray insertion/withdrawal position, said memory member being released from said tray transfer means and left over in a position of its previous engagement with said tray transfer mechanism assigned before said tray transfer means departs from said tray insertion/withdrawal position;
    (d) a drive means for moving said tray transfer means selectively in said first and second directions; and
    (e) a contact-type switch for controlling activation and de-activation of said drive means depending on the position of said memory member in said first direction.

2. A disc-type recording medium transfer mechanism according to claim 1, further including a main base plate supporting thereon said magazine storage and having a portion defining said playback standby position, and an auxiliary base plate disposed above said portion of said main base plate and operatively connected with and driven by said drive means to move in said first direction toward and away from said playback standby position, said tray transfer means being mounted on said auxiliary base plate for movement in said first direction together with said auxiliary plate, said tray transfer means being operatively connected with and driven by said drive means to move in said second direction.

3. A disc-type recording medium transfer mechanism according to claim 2, wherein said drive means includes a motor-driven worm gear rotatably mounted on said main base plate and extending in a direction parallel to said first direction, and a rack secured to said auxiliary base plate and meshing with said worm gear.

4. A disc-type recording medium transfer mechanism according to claim 2, wherein said main base plate and said auxiliary base plate are connected together by a link mechanism having at least one pair of elongate link plates pivoted together at their central portions, one of said link plates having one end pivotably connected to said main base plate and the other end pivotably and slidably connected to said auxiliary base plate, the other link plate having one end pivotably and slidably connected to said main base plate and the other end pivotably connected to said auxiliary base plate.

5. A disc-type recording medium transfer mechanism according to claim 2, wherein said tray transfer means includes a transfer member slidably mounted on said auxiliary base plate and having a hole, and a hook member pivotably connected to said transfer member and lockingly engageable with said selected tray to releasably hook the same, said drive means including a slide member reciprocably movable in said second direction and having a guide column extending in a direction parallel to said first direction and slidably fitted in said hole in said transfer member.

6. A disc-type recording medium transfer mechanism according to claim 5, wherein said auxiliary base plate has a guide groove extending in a direction parallel to said second direction, said transfer member having a guide projection slidably received in said guide groove.

7. A disc-type recording medium transfer mechanism according to claim 5, wherein said drive means includes at least one motor driven gear and a rack meshing with said gear and connected to said slide member, said rack extending in a direction parallel to said second direction.

8. A disc-type recording medium transfer mechanism according to claim 5, wherein said drive means includes plural gears having a same structure and arranged at predetermined intervals in the second direction, said gears being driven in a same direction and in unison by a rotary force transmitting means, said guide column being provided with a rack held in meshing engagement with at least one of said plural gears.

9. A disc-type recording medium transfer mechanism according to claim 2, further including an elongate support plate secured to said main base plate at a position adjacent to said tray insertion/withdrawal position and extending therefrom in a direction parallel to said first direction, said support plate having a plurality of locking recesses corresponding in number to the number of said trays and spaced apart in said first direction, said memory member being slidably mounted on said support plate and movable therealong in said first direction, said memory member including a locking piece slidably movable in said second direction and having an end releasably engageable with a selected one of said locking recesses to lock said memory member in position against displacement with respect to said support plate, said locking piece being normally urged in a direction to engage said end of said locking piece and said selected locking recess, said tray transfer means including a locking prong engageable with said locking piece to urge the same in an opposite direction to disengage said end of said locking piece and said selected locking recess when said tray transfer means is disposed in said tray insertion/withdrawal position.

10. A disc-type recording medium transfer mechanism according to claim 9, wherein said memory member has a retaining recess opening in a direction away from said locking recesses and receptive of said locking prong.

11. A disc-type recording medium transfer mechanism according to claim 2, wherein said contact-type switch is associated with said memory member and having an actuator, said auxiliary base plate having an engagement portion engageable with said actuator to activate said contact-type switch.

12. A disc-type recording medium transfer mechanism according to claim 2, further including a stop lever linked with said tray storage and angularly movable, in response to movement of said auxiliary base plate in said first direction, to extend diagonally across at least a part of one opening of said tray storage for preventing said trays from plunging out from said magazine toward said playback standby position.

* * * * *